UNITED STATES PATENT OFFICE.

CORNELIUS E. HAYNES, OF BOSTON, MASSACHUSETTS, ASSIGNOR TO AMOS L. WOOD, TRUSTEE, OF SAME PLACE.

COMPOUND FOR MAKING PAPER LEATHER-BOARD, &c.

SPECIFICATION forming part of Letters Patent No. 377,072, dated January 31, 1888.

Application filed April 13, 1887. Serial No. 234.697. (No specimens.)

*To all whom it may concern:*

Be it known that I, CORNELIUS E. HAYNES, of Boston, in the county of Suffolk and State of Massachusetts, have invented a new and useful Improved Compound for Making Paper Leather-Board, &c., of which the following is a specification.

The object of my invention is to prepare a compound of such a nature that when it is subjected to pressure, drainage, and desiccation a hard water and oil proof sheet is produced, which can be used as a substitute for paper leather-board, &c. I attain this object by using the following mixture, compounded substantially as per formula set forth.

In using my compound I do not need to use any prescribed form of apparatus, as my compound can be used in any of the paper or pulp machine or leather-board-making devices, yet I have designed a special set of devices which together constitute an apparatus particularly adapted for using my compound, and for which I have made an application (of even date) for a patent.

My formula is as follows: For making a thousand parts, by weight, I take of silicate of soda 1.42 parts; rosin, 1.42 parts; alum, .76 parts; crude potassa, .40 parts; fish-glue, 2.00 parts; water, 955.00 parts. After these ingredients are intimately mixed by grinding the solids and then stirring in water within the tank, I place within the tank sheets of copper and zinc to generate an electro-chemical action. Then the mass is heated nearly or quite to the boiling temperature and constantly agitated until the whole has formed an apparent chemical union, although in the form of an unstable compound. To the fluid thus formed I add thirty-nine parts of pulp and sufficient coloring-matter to give the required tint. The compound is now ready to be treated in the same manner that ordinary paper-pulp is manipulated.

I claim—

The herein-described composition of matter to be used for making paper leather-board, &c., consisting of water, silicate of soda, rosin, alum, crude potassa, fish-glue, pulp, and coloring-matter, in the proportions and manner specified.

CORNELIUS E. HAYNES.

Witnesses:
   AMOS L. WOOD,
   FRANK G. PARKER.